(12) United States Patent
Yoshida et al.

(10) Patent No.: US 8,404,142 B2
(45) Date of Patent: Mar. 26, 2013

(54) MNZN FERRITE AND A TRANSFORMER MAGNETIC CORE

(75) Inventors: Hirofumi Yoshida, Chiba (JP); Yukiko Nakamura, Chiba (JP); Satoshi Goto, Okayama (JP)

(73) Assignee: JFE Chemical Corporation (JP)

( * ) Notice: Subject to any disclaimer, the term of this patent is extended or adjusted under 35 U.S.C. 154(b) by 0 days.

(21) Appl. No.: 12/863,642

(22) PCT Filed: Jan. 23, 2009

(86) PCT No.: PCT/JP2009/051403
§ 371 (c)(1),
(2), (4) Date: Sep. 14, 2010

(87) PCT Pub. No.: WO2009/093756
PCT Pub. Date: Jul. 30, 2009

(65) Prior Publication Data
US 2011/0012702 A1 Jan. 20, 2011

(30) Foreign Application Priority Data

Jan. 23, 2008 (JP) ................................. 2008-013135

(51) Int. Cl.
*C04B 35/26* (2006.01)
*C04B 35/64* (2006.01)

(52) U.S. Cl. .................................. 252/62.59; 252/62.62

(58) Field of Classification Search ............... 252/62.61, 252/62.62, 62.51 R, 62.56, 62.59; 336/233
See application file for complete search history.

(56) References Cited

U.S. PATENT DOCUMENTS

| 6,402,979 | B1 | 6/2002 | Saita et al. |
| 6,458,286 | B1 | 10/2002 | Takagawa et al. |
| 2002/0009413 | A1 * | 1/2002 | Yasuhara et al. ............... 423/594 |
| 2004/0090302 | A1 * | 5/2004 | Sezai et al. ..................... 336/233 |
| 2004/0130429 | A1 | 7/2004 | Watanabe et al. |

FOREIGN PATENT DOCUMENTS

| JP | 7-297020 A | 11/1995 |
| JP | 2001-064076 A | 3/2001 |
| JP | 2001233667 A * | 8/2001 |
| JP | 2004-161500 A | 6/2004 |
| JP | 2004-196632 A | 7/2004 |
| JP | 2005-179092 A | 7/2005 |
| JP | 2006-151701 A | 6/2006 |
| JP | 2006151701 A * | 6/2006 |
| JP | 2006-213532 A | 8/2006 |
| JP | 2006213532 A * | 8/2006 |
| JP | 2006-273673 A | 10/2006 |
| JP | 2007-197245 A | 8/2007 |
| JP | 2007-331980 A | 12/2007 |

OTHER PUBLICATIONS

Machine translation of JP2006213532A.*
V.T. Zaspalis et al., "The effect of dopants on the incremental permeability of MnZn-ferrites," Journal of Magnetism and Magnetic Materials, vol. 313, 2007, pp. 29-36.

\* cited by examiner

*Primary Examiner* — Emily Le
*Assistant Examiner* — Lynne Edmondson
(74) *Attorney, Agent, or Firm* — DLA Piper LLP (US)

(57) ABSTRACT

A MnZn ferrite having excellent characteristics of an incremental permeability μΔ value of 250 or greater in a wide temperature range of 0 to 85° C. and an incremental permeability μΔ value of 400 or greater at 65° C. when an 80 A/m direct current magnetic field is applied is provided. The MnZn ferrite has basic components that comprise: ferric oxide (in terms of $Fe_2O_3$): 51.0 to 54.5 mol %, zinc oxide (in terms of ZnO): 8.0 to 12.0 mol %, and manganese oxide (in terms of MnO): the balance, sub components that comprise: silicon oxide (in terms of SiO2): 50 to 400 mass ppm, and calcium oxide (in terms of CaO): 50 to 400 mass ppm, and unavoidable impurities phosphorous, boron, sulfur and chlorine that are restricted to phosphorous: less than 3 mass ppm, boron: less than 3 mass ppm, sulfur: less than 5 mass ppm, and chlorine: less than 10 mass ppm.

10 Claims, No Drawings

MNZN FERRITE AND A TRANSFORMER MAGNETIC CORE

RELATED APPLICATIONS

This is a §371 of International Application No. PCT/JP2009/051403, with an international filing date of Jan. 23, 2009 (WO 2009/093756 A1, published Jul. 30, 2009), which is based on Japanese Patent Application No. 2008-013135, filed Jan. 23, 2008, the subject matter of which is incorporated by reference.

TECHNICAL FIELD

This disclosure relates to MnZn ferrite that is suitable as a magnetic core and, more particularly, to MnZn ferrite that is suitable for use in the magnetic core of a pulse transformer of an Ethernet (registered trademark) device.

BACKGROUND

In Ethernet (registered trademark) devices, pulse transformers are used for the purpose of maintaining impedance matching and electrical isolation at the input/output terminals. Inside this kind of transformer, a soft magnetic material is typically used as the magnetic core. Moreover, it is desirable that in a temperature range of −40 to 85° C. and under application of a direct current magnetic field, the pulse transformer have high incremental permeability $\mu\Delta$, such as regulated by US standards ANSI X3.263-1995[R2000].

Through the recent advancement of communication technology, not only are transmission speeds becoming faster in Ethernet (registered trademark) devices, but there is also a trend of directly supplying drive power for the device together with the transmission signal. In this case, larger current is applied to and used in the pulse transformer than in the past. Moreover, because surrounding parts inside the transform become hot due to large current, the magnetic core of the pulse transformer is used in a higher temperature condition. Therefore, for MnZn ferrites that are used in the magnetic core of a pulse transformer, it is desired that high impedance, or in other words, high incremental permeability $\mu\Delta$ be maintained when a direct current magnetic field that is higher than in the aforementioned standards is applied. The incremental permeability $\mu\Delta$ is a value that indicates the ease of magnetizing the magnetic core in a state where a magnetic field is applied.

In JP 2004-196632, a technique is disclosed whereby magnetic properties are improved under conditions of high temperature by including a cobalt oxide in the MnZn ferrite. However, in the past, the composition of the MnZn ferrite for a pulse transformer has been designed to obtain a high initial permeability $\mu i$ so the saturation magnetic flux density is low and, therefore, it was not possible to obtain sufficient incremental permeability $\mu\Delta$ under conditions of high temperature and a high magnetic field.

In JP 7-297020 it is disclosed that a reduction of phosphorous and boron is effected in improving the incremental permeability $\mu\Delta$. However, the MnZn ferrite disclosed in JP 7-297020 has a composition that was selected for the purpose of reducing iron loss and increasing the effective permeability at 100° C., and because the initial permeability $\mu i$ at room temperature or lower, which is not mentioned in the embodiments, is too low, it is difficult to hope for an incremental permeability $\mu\Delta$ that is sufficiently satisfactory in low-temperature conditions.

In JP 2006-213532, JP 2001-64076 and JP 2005-179092, techniques are disclosed that regulate the aforementioned impurities. In JP 2006-213532, a technique is disclosed that improves the iron loss and amplitude ratio permeability at 100° C. or lower by regulating the contained amount of chlorine. However, it was impossible to obtain an incremental permeability $\mu\Delta$ of 200 or greater at 23° C. by regulating just the contained amount of chlorine.

In JP 2001-64076, a technique is disclosed that improves electrical power loss by regulating the contained amount of sulfur. However, it was impossible to obtain an incremental permeability $\mu\Delta$ of 200 or greater at 23° C. by regulating just the contained amount of chlorine.

In JP 2005-179092, a technique is disclosed that suppresses abnormal grain growth of ferrite and prevents adverse effects on the properties of the ferrite by regulating the contained amount of phosphorous, boron, sulfur and chlorine. With this technique, MnZn ferrite having a high specific resistance and low squareness ratio is obtained. However, the incremental permeability $\mu\Delta$ under the condition of a high magnetic field could not be called sufficient.

It could therefore be helpful to provide MnZn ferrite having a high incremental permeability $\mu\Delta$ in a wide range of temperatures, and particularly in conditions of high temperature and high magnetic field, as well as a transformer magnetic core that is manufactured using that MnZn ferrite.

SUMMARY

We studied the causes of incremental permeability $\mu\Delta$ dropping when a high magnetic field is applied. When a magnetic field is applied, the domain wall displaces inside the magnetized magnetic core from the state it was in before a magnetic field was applied. However, when a large 80 A/m magnetic field is applied, the domain wall displaces a long distance. Hence, when there is abnormal grain inside the magnetic core, the probability of the domain wall being obstructed by component segregation or vacancies increases. When impurity components exist in the magnetic core at a set amount or greater, abnormal grain growth occurs inside the magnetic core, which greatly obstructs the displacement of the domain wall. Therefore, in a state in which domain wall displacement is hindered by component segregation inside abnormal grain, there is an extreme drop in the incremental permeability $\mu\Delta$ value. Consequently, it is necessary to suppress the occurrence of abnormal grain growth. As a result of studying methods of suppression, we found that it is essential that the unavoidable impurities phosphorous, boron, sulfur and chlorine existing in MnZn ferrite be restricted more strictly than done conventionally.

Moreover, as a result of strictly restricting these impurities, we found that by adjusting the contained amounts of the basic components ferric oxide and zinc oxide within a suitable range and increasing the saturation magnetic flux density, while at the same time including suitable amounts of silicone oxide and calcium oxide as sub components, it was possible to suitably reduce the initial permeability $\mu i$ and keep the magnetic core from saturating even when a large 80 A/m magnetic field is applied.

We thus provide:
1. A MnZn ferrite comprising a basic component, a sub component and unavoidable impurities, wherein the sub component consisting of
    silicon oxide (in terms of SiO2): 50 to 400 mass ppm, and
    calcium oxide (in terms of CaO): 50 to 4000 mass ppm
    is added to the basic component consisting essentially of ferric oxide (in terms of $Fe_2O_3$): 51.0 to 54.5 mol %
zinc oxide (in terms of ZnO): 8.0 to 12.0 mol %, and
manganese oxide (in terms of MnO): balance, and further of unavoidable impurities phosphorous, boron, sulfur and chlorine are restricted to
phosphorous: less than 3 mass ppm,
boron: less than 3 mass ppm,
sulfur: less than 5 mass ppm, and
chlorine: less than 10 mass ppm.
2. The MnZn ferrite according to 1, wherein
cobalt oxide (in terms of CoO): 50 to 3000 mass ppm
is further added as the sub component.
3. The MnZn ferrite according to 1 or 2, wherein one or more than two selected from the group consisting of
zirconium oxide (in terms of $ZrO_2$): 0.005 to 0.075 mass %,
tantalum oxide (in terms of $Ta_2O_5$): 0.005 to 0.075 mass %,
hafnium oxide (in terms of $HfO_2$): 0.005 to 0.075 mass %,
niobium oxide (in terms of $Nb_2O_5$): 0.005 to 0.075 mass %
is further added as the sub component.
4. A magnetic core for a transformer comprising the MnZn ferrite according to any one of 1 to 3.

DETAILED DESCRIPTION

Our MnZn ferrites and cores will be explained in detail below.

First, the reason that the basic component composition of the MnZn ferrite is limited to the aforementioned range will be explained.

Ferric oxide (in terms of $Fe_2O_3$): 51.0 to 54.5 mol %

Of the basic components, when ferric oxide is less than 51.0 mol %, or when ferric oxide is greater than 54.5 mol %, in both a low temperature range and high temperature, range the incremental permeability $\mu\Delta$ deteriorates under application of a direct current magnetic field. Therefore, the contained amount of ferric oxide in terms of $Fe_2O_3$ is 51.0 to 54.5 mol %, preferably 52.0 to 54.0 mol %.

Zinc oxide (in terms of ZnO): 8.0 to 12.0 mol %

When the contained amount of zinc oxide is less than 8.0 mol %, a sufficient incremental permeability $\mu\Delta$ cannot be obtained when a direct current magnetic field is applied. On the other hand, when the contained amount of zinc oxide exceeds 12.0 mol %, the incremental permeability $\mu\Delta$ decreases in a low-temperature condition when a direction current magnetic field is applied, and in a high-temperature condition, the Curie temperature at which ferromagnetic material loses its magnetism drops, so the incremental permeability $\mu\Delta$ greatly drops when a direct current magnetic field is applied. Therefore, the contained amount of zinc oxide in terms of ZnO is within the range of 8.0 to 12.0 mol %, preferably 9.0 to 11.0 mol %.

Manganese oxide (in terms of MnO): the balance

Our ferrite is a MnZn ferrite and it is necessary that the balance (i.e., remaining part) of the basic component composition be manganese oxide. The reason for that is that by containing manganese oxide, a high incremental permeability $\mu\Delta$ of 250 or greater is obtained when an 80 A/m direct current magnetic field is applied at 0 to 85° C., and a high value of 400 or greater is obtained at 65° C. The basic components, ferric oxide, zinc oxide and manganese oxide are adjusted so that the total amount when the components are reduced to $Fe_2O_3$, ZnO and MnO becomes 100 mol %.

Next, the reason that the sub component composition of the MnZn ferrite is limited within the aforementioned range will be explained.

Silicon oxide (in terms of SiO2): 50 to 400 mass ppm

Silicon oxide has the effect of increasing the incremental permeability $\mu\Delta$ when a direct current magnetic field is applied by reducing the number of residual holes inside the crystal grain. However, when the contained amount of silicon oxide is less than 50 mass ppm, there is little added effect. On the other hand, when the contained amount of silicon oxide exceeds 400 mass ppm, abnormal grain appears, and the value of the incremental permeability $\mu\Delta$ drops greatly when a direct current magnetic field is applied. Therefore, the contained amount of silicon oxide in terms of $SiO_2$ is within the range 50 to 400 mass ppm, preferably 100 to 250 mass ppm.

Calcium oxide (in terms of CaO): 50 to 4000 mass ppm

Calcium oxide effectively contributes to improvement of the incremental permeability $\mu\Delta$ when a direct current magnetic field is applied by appropriately lowering the value of the initial permeability $\mu i$ through the effect of crystal grain boundary segregation of MnZn ferrite and suppressing crystal grain growth. However, when the contained amount of calcium oxide is less than 50 mass ppm, it is not possible to obtain a sufficient effect of suppressing grain growth. On the other hand, when the contained amount of calcium oxide exceeds 4000 mass ppm, abnormal grain appears, and the incremental permeability $\mu\Delta$ greatly decreases when a direct current magnetic field is applied. Therefore, the contained amount of calcium oxide in terms of CaO is in the range of 50 to 4000 mass ppm, preferably 250 to 2500 mass ppm.

The preferable range for the value of the initial permeability $\mu$ at 23° C. is 2500 to 4500. In addition, to improve the incremental permeability $\mu\Delta$ when a direct current magnetic field is applied, it is important that the impurities, particularly phosphorous, boron, sulfur and chlorine, are at the same time confined within the ranges given below.

Phosphorous: Less than 3 mass ppm; Boron: Less than 3 mass ppm

Phosphorous and boron are unavoidable impurities mixed in from raw ferric oxide. When the contained amount of either phosphorous or boron is 3 mass ppm or greater, abnormal grain growth is induced and incremental permeability $\mu\Delta$ decreases greatly when an 80 A/m direct current magnetic field is applied. Therefore, the contained amounts of phosphorous and boron are restricted to less than 3 mass ppm.

The method for restricting phosphorous and boron to less than 3 mass ppm, could, for example, be a method of using highly pure ferric oxide, zinc oxide and manganese oxide as the raw material powder with the contained amount of phosphorous and boron being as small as possible. Moreover, to avoid the possibility of phosphorous and boron being mixed in due to friction of the medium when a ball mill or attritor is used for mixing and pulverizing, using a medium of which the contained amount of phosphorous and boron is small is preferred.

Sulfur: Less than 5 mass ppm

Sulfur is an unavoidable impurity mixed in from the raw ferric oxide obtained from ferric sulfide. When the contained amount of sulfur is 5 mass ppm or greater, abnormal grain growth is induced, and incremental permeability $\mu\Delta$ decreases greatly when an 80 A/m direct current magnetic field is applied. Therefore, the contained amount of sulfur is restricted to less than 5 mass ppm, more preferably less than 4 mass ppm.

The method for restricting sulfur to less than 5 mass ppm could be a method wherein by making the time of the calcination process that is performed in atmospheric conditions at 800° C. or greater when manufacturing MnZn ferrite long, the contained amount of sulfur is decreased by causing sufficient reaction between sulfur and oxygen.

Chlorine: Less than 10 mass ppm

Chlorine is an unavoidable impurity mixed in from the raw ferric oxide obtained from ferric chloride. When the contained amount of chlorine is 10 mass ppm or greater, abnormal grain growth is induced, and incremental permeability $\mu\Delta$ decreases greatly when an 80 A/m direct current magnetic field is applied. Therefore, the contained amount of chlorine is restricted to being less than 10 mass ppm, further preferably less than 8 mass ppm. The method for restricting chlorine to less than 10 mass ppm could be a method wherein, for example, the contained amount of chlorine is reduced by sufficiently washing raw ferric oxide in pure water and dissolving easily ionized chlorine in pure water when manufacturing MnZn ferrite.

As described above, by restricting the contained amounts of phosphorous, boron, sulfur and chlorine of the unavoidable impurities in MnZn ferrite, it is possible to obtain the excellent characteristics of an incremental permeability $\mu\Delta$ of 250 or greater in a temperature range of 0 to 85° C. and an incremental permeability $\mu\Delta$ of 400 or greater at 65° C. when an 80 A/m direct current magnetic field is applied.

It is preferred that the contained amount of unavoidable impurities other than phosphorous, boron, sulfur and chlorine each be 50 mass ppm or less. However, the amount is not particularly limited.

In the MnZn ferrite, in addition to the components described above, the following components can also be contained as sub components.

Cobalt oxide (in terms of CoO): 50 to 3000 ppm

By mixing in an adequate amount of cobalt oxide, which has positive magnetic anisotropy, it is possible to increase incremental permeability $\mu\Delta$ when a direct current magnetic field is applied over a wide temperature range of 0 to 85° C. When the contained amount of cobalt oxide is less than 50 mass ppm, there is little additive effect. However, when the contained amount of cobalt oxide exceeds 3000 mass ppm, incremental permeability $\mu\Delta$ decreases when a direct current magnetic field is applied in a range of all temperatures. Therefore, the contained amount of cobalt oxide in terms of CoO is set within the range of 50 to 3000 mass ppm.

One or two or more components from among Zirconium oxide (in terms of $ZrO_2$): 0.005 to 0.075 mass %, Tantalum oxide (in terms of $Ta_2O_5$): 0.005 to 0.075 mass %, Hafnium oxide (in terms of $HfO_2$): 0.005 to 0.075 mass %, and Niobium oxide (in terms of $Nb_2O_5$): 0.005 to 0.075 mass % are compounds each having a high melting point, and have the effect of making the crystal grain small when contained in MnZn ferrite. Hence, they make it possible to suppress generation of rough crystal grain and improve incremental permeability $\mu\Delta$ when a direct current magnetic field is applied. This effect cannot be obtained sufficiently when the contained amount of Zirconium oxide (in terms of $ZrO_2$) is less than 0.0055 mass %, the contained amount of Tantalum oxide (in terms of $Ta_2O_5$) is less than 0.005 mass %, the contained amount of Hafnium oxide (in terms of $HfO_2$) is less than 0.005 mass %, and the contained amount of Niobium oxide (in terms of $Nb_2O_5$) is less than 0.005 mass %. On the other hand, when the contained amount of Zirconium oxide (in terms of $ZrO_2$) exceeds 0.075 mass %, the contained amount of Tantalum oxide (in terms of $Ta_2O_5$) exceeds 0.075 mass %, the contained amount of Hafnium oxide (in terms of $HfO_2$) exceeds 0.075 mass % and the contained amount of Niobium oxide (in terms of $Nb_2O_5$) exceeds 0.075 mass %, abnormal grain is generated, and incremental permeability $\mu\Delta$ decreases when a direct current magnetic field is applied. Therefore, the contained amounts of these compounds are set to the ranges described above.

By adding the aforementioned additive groups at the same time as cobalt oxide, it is possible to greatly increase the value of the incremental permeability $\mu\Delta$ when an 80 A/m magnetic field is applied. The reason for this in not clear. However, it is feasible that when cobalt oxide and zirconium oxide, tantalum oxide, hafnium oxide and niobium oxide are added at the same time, compounds are generated that cause incremental permeability $\mu\Delta$ to increase.

Next, the preferred grain size of the MnZn ferrite will be explained. Generation of abnormal grain causes incremental permeability $\mu\Delta$ to decrease when a direct current magnetic field is applied. Therefore, it is preferred that the average crystal grain size be from 5 to less than 15 µm.

Next, the preferred manufacturing method of the MnZn ferrite is explained. First, ferric oxide, zinc oxide and manganese oxide powders are weighed so that specified ratios are obtained. Then, these powders are thoroughly mixed after which calcining is performed. Next, the obtained calcined powder is pulverized. Furthermore, when adding the aforementioned sub components, the components are added at the specified ratios, and pulverized at the same time as the calcined powder.

This work must be performed such that the powder is sufficiently homogeneous such that there is no bias in the density of the added components. The powder having the intended composition is granulated using an organic binder such as polyvinyl alcohol, and after formation by applying pressure, sintering is performed under suitable sintering conditions.

The MnZn ferrite that was obtained is able to achieve a high incremental permeability $\mu\Delta$ value of 250 or greater in a temperature range of 0 to 85° C., and 400 or greater at 65° C. when a large 80 A/m direct current magnetic field is applied, which was not possible with a conventional MnZn ferrite.

In conventional MnZn ferrite the lowest incremental permeability $\mu\Delta$ value in a temperature rage of 0 to 85° C. is about 150, and at 65° C. the incremental permeability $\mu\Delta$ value at its highest did not exceed 300 when a large 80 A/m direct current magnetic field is applied.

EXAMPLE 1

The raw materials that were weighed to obtain the ratios illustrated in Table 1 were mixed for 16 hours using a ball mill, after which calcining was performed for 3 hours in air at 925° C. Next, pulverization was performed for 12 hours in the ball mill, then polyvinyl alcohol was added to the obtained mixed powder and granulated. A toroidal core was formed by applying a 118 MPa pressure. The formed compact was placed in a sintering furnace and sintered at a maximum temperature of 1350° C. to obtain a sintered core having an outer diameter of 25 mm, inner diameter of 15 mm, and height of 5 mm.

The raw materials used, beginning with ferric oxide, were all highly pure and thoroughly washed with pure water that contained hardly any chlorine. In addition, the ball mill used a mixing and pulverizing medium that contained very little phosphorous and boron, and calcining was thoroughly performed under a condition of airflow. In this way, the impurities in all of the test specimens were: phosphorous: 2 mass ppm, boron: 2 mass ppm, sulfur: 3 mass ppm and chlorine: 6 mass ppm.

For each of the test specimens that were obtained, a 10-turn winding was performed, and using a direct current application device (42841A: Agilent Technologies) to apply an 80 A/m direct current magnetic field to the magnetic core, incremental permeability μΔ was measured at a measurement voltage of 100 mV, a measurement frequency of 100 kHz and temperatures of 0, 23, 65 and 85° C. The initial permeability μi was measured at 23° C. using an LCR meter (4284A). To measure the crystal grain size of each of the test specimens, the test specimens were cut through the core, the cut surfaces were then polished and photographed at three different fields of view at a magnification rate of 500 using an optical microscope, after which the average crystal grain size was calculated from the grain sizes measured for the grain particles in the images.

The method for finding the average grain size is performed, for example, as described below. First, a diagonal line is drawn through the image, and the length is calculated from the magnification rate (the length of the diagonal line=x). Next, for each image, the number of crystal grain boundaries through which two diagonal lines pass are counted (number of crystal grain boundaries=n). Counting is performed for three fields of view and 6 diagonal lines, and the average of x/(n+1) is taken to be the average crystal grain size.

The obtained result is illustrated in Table 1.

μΔ value at 0 and 85° C. was less than 250, and the incremental permeability μΔ value at 65° C. was less than 400, when an 80 A/m direct current magnetic field was applied.

Moreover, in the comparative example (test specimen 1-5) having a contained amount of zinc oxide (in terms of ZnO) greater than 12.0 mol %, the incremental permeability μΔ value at 85° C. was less than 250, and the incremental permeability μΔ value at 65° C. was less than 400, when an 80 A/m direct current magnetic field was applied. On the other hand, in the comparative example (test specimen 1-6) having a contained amount of zinc oxide (in terms of ZnO) less than 8.0 mol %, the incremental permeability μΔ value dropped in the entire temperature range, when an 80 A/m direct current magnetic field was applied, with the incremental permeability μΔ value at 0° C. being less than 250, and the incremental permeability μΔ value at 65° C. being less than 400.

Furthermore, when taking notice of silicone oxide and calcium oxide, in the comparative examples (test specimens 1-8 and 1-9) when the contained amount of one these is less than the suitable range, the initial permeability μi adequately

TABLE 1

| Specimen number | Basic component (mol %) | | | Sub component (mass ppm) | | Initial permeability μi | Incremental permeability μΔ under application of an 80 A/m direct current magnetic field | | | | Average crystal grain size | Remarks |
|---|---|---|---|---|---|---|---|---|---|---|---|---|
| | Fe$_2$O$_3$ | ZnO | MnO | SiO$_2$ | CaO | 23° C. | 0° C. | 23° C. | 65° C. | 85° C. | (μm) | |
| 1-1 | 55.0 | 10.0 | Remaining part | 100 | 500 | 2200 | 210 | 260 | 360 | 210 | 8 | Comparative example |
| 1-2 | 50.5 | 10.0 | Remaining part | 100 | 500 | 2300 | 230 | 280 | 370 | 220 | 8 | Comparative example |
| 1-3 | 53.4 | 10.5 | Remaining part | 100 | 500 | 3500 | 280 | 360 | 470 | 320 | 8 | Invention example |
| 1-4 | 52.0 | 10.0 | Remaining part | 100 | 500 | 3300 | 290 | 370 | 460 | 300 | 8 | Invention example |
| 1-5 | 52.0 | 12.5 | Remaining part | 100 | 500 | 4000 | 300 | 380 | 380 | 220 | 8 | Comparative example |
| 1-6 | 52.0 | 7.5 | Remaining part | 100 | 500 | 2700 | 200 | 270 | 340 | 240 | 8 | Comparative example |
| 1-7 | 51.8 | 10.0 | Remaining part | 100 | 500 | 3200 | 300 | 380 | 430 | 280 | 8 | Invention example |
| 1-8 | 52.0 | 10.0 | Remaining part | 20 | 500 | 4800 | 190 | 280 | 300 | 180 | 17 | Comparative example |
| 1-9 | 52.0 | 10.0 | Remaining part | 100 | 35 | 5200 | 180 | 280 | 310 | 190 | 19 | Comparative example |
| 1-10 | 52.0 | 10.0 | Remaining part | 250 | 2500 | 2900 | 280 | 370 | 470 | 310 | 7 | Invention example |
| 1-11 | 52.0 | 10.0 | Remaining part | 450 | 500 | 1100 | 110 | 170 | 240 | 110 | 160 | Comparative example |
| 1-12 | 52.0 | 10.0 | Remaining part | 100 | 4500 | 1000 | 100 | 160 | 230 | 100 | 141 | Comparative example |
| 1-13 | 52.0 | 10.0 | Remaining part | 450 | 4500 | 800 | 70 | 90 | 110 | 60 | 193 | Comparative example |

Note:
Underlined values are values outside the suitable range.

A can be seen from Table 1, it was confirmed that for all of the test specimens 1-3, 1-4, 1-7 and 1-10, which are our examples, excellent characteristics were obtained, with an incremental permeability value μΔ of 250 or greater in a temperature range of 0 to 85° C., and an incremental permeability μΔ value of 400 or greater at 65° C., when a 80 A/m direct current magnetic field was applied. On the other hand, in the comparative example (test specimen 1-1) having a contained amount of ferric oxide (in terms of Fe$_2$O$_3$) greater than 54.5 mol %, and in the comparative example (test specimen 1-2) having a contained amount of ferric oxide (in terms of Fe$_2$O$_3$) less than 51.0 mol %, the incremental permeability rose as a result. However, incremental permeability μΔ values over the entire temperature range were lower than in our examples, with the incremental permeability μΔ value at 0° C. being less than 250, and the incremental permeability μΔ value at 65° C. being less than 400, when an 80 A/m direct current magnetic field was applied. On the other hand, in the comparative examples (test specimens 1-11, 1-12 and 1-13) in which the contained amount of one of silicone oxide and calcium oxide is greater than the suitable range, abnormal grain appeared. As a result, incremental permeability μΔ over the entire temperature range greatly degraded when an 80 A/m direct current magnetic field was applied.

EXAMPLE 2

Various ferric oxide raw materials having different contained amounts of phosphorous, boron, sulfur and chlorine were used and, after calculating the amounts so that the final contained amounts in the test specimens were phosphorous: 2 to 10 mass ppm, boron: 2 to 10 mass ppm, sulfur: 3 to 15 mass ppm and chlorine: 6 to 30 mass ppm, the raw materials were weighed out so that the contained amount of ferric oxide (in terms of $Fe_2O_3$) was 52.0 mol %, the contained amount of zinc oxide (in terms of ZnO) was 10.0 mol % and the contained amount of manganese oxide (in terms of MnO) was the balance. Then, after mixing the materials in a ball mill for 16 hours, calcining was performed in air for 3 hours at 925° C. Next, the material was pulverized for 12 hours in the ball mill, polyvinyl alcohol was added to the obtained mixed powder and the mixture was granulated. Then, a 118 MPa pressure was applied to form a toroidal core. The compact was placed in a sintering furnace and sintered at a maximum temperature of 1350° C. to obtain a sintered compact core having an outer diameter of 25 mm, inner diameter of 15 mm and a height of 5 mm.

Using the same method as described above, the two following conventional examples were made. The first conventional example had as the final contained amounts of the test specimen, as basic compounds, ferric oxide (in terms of $Fe_2O_3$): 49.0 mol %, zinc oxide (in terms of ZnO): 21.0 mol %, cobalt oxide (in terms of CoO): 2.0 mol % and manganese oxide (in terms of MnO): the balance, with impurities being phosphorous: 2 mass ppm, boron: 2 mass ppm, sulfur: 3 mass ppm or less and chlorine: 6 mass ppm; and the second conventional example having as sub components added to the conventional example described above silicone oxide (in terms of $SiO_2$): 0.015 mass % and calcium oxide (in terms of CaO): 0.050 mass %.

A 10-turn winding was performed for each of the obtained specimens, and using the same direct current application device and LCR meter as used in Example 1, an 80 A/m direct current magnetic field was applied to the magnetic core. At a measurement voltage of 100 mV and measurement frequency of 100 kHz, incremental permeability $\mu\Delta$ was measured at 0, 23, 65 and 85° C. The initial permeability $\mu i$ was measured at 23° C. using an LCR meter (4284A). In addition, to measure the crystal grain size of each of the test specimens, the test specimens were cut through the core, the cut surfaces were then polished and photographed at three different fields of view at a magnification rate of 500 using an optical microscope, after which the average crystal grain size was calculated from the grain sizes measured for the grain particles in the images.

The results are given in Table 2.

TABLE 2

| Specimen number | Impurities (mass ppm) | | | | Initial permeability $\mu i$ 23° C. | Incremental permeability $\Delta \mu$ under application of an 80 A/m direct current magnetic field | | | | Average crystal grain size (µm) | Remarks |
|---|---|---|---|---|---|---|---|---|---|---|---|
| | P | B | S | Cl | | 0° C. | 23° C. | 65° C. | 85° C. | | |
| 1-4 | 2 | 2 | 3 | 6 | 3300 | 290 | 370 | 460 | 300 | 8 | Invention example |
| 2-1 | 2 | 2 | 4 | 8 | 3100 | 280 | 360 | 440 | 290 | 10 | Invention example |
| 2-2 | <u>5</u> | 2 | 3 | 6 | 2400 | 210 | 270 | 380 | 200 | 22 | Comparative example |
| 2-3 | 2 | <u>5</u> | 3 | 6 | 2200 | 200 | 260 | 360 | 190 | 25 | Comparative example |
| 2-4 | 2 | 2 | <u>8</u> | 6 | 2300 | 220 | 280 | 380 | 220 | 21 | Comparative example |
| 2-5 | 2 | 2 | 3 | <u>15</u> | 2300 | 230 | 280 | 380 | 220 | 23 | Comparative example |
| 2-6 | <u>5</u> | <u>5</u> | 3 | 6 | 1900 | 170 | 230 | 350 | 150 | 39 | Comparative example |
| 2-7 | 2 | 2 | <u>8</u> | <u>15</u> | 2000 | 160 | 220 | 330 | 160 | 42 | Comparative example |
| 2-8 | <u>5</u> | 2 | <u>8</u> | <u>15</u> | 1200 | 130 | 190 | 230 | 120 | 52 | Comparative example |
| 2-9 | <u>5</u> | <u>5</u> | 3 | <u>15</u> | 900 | 120 | 180 | 210 | 120 | 59 | Comparative example |
| 2-10 | <u>5</u> | <u>5</u> | <u>8</u> | 6 | 900 | 120 | 180 | 220 | 110 | 64 | Comparative example |
| 2-11 | <u>5</u> | <u>5</u> | <u>8</u> | <u>15</u> | 700 | 100 | 140 | 190 | 90 | 178 | Comparative example |
| 2-12 | <u>10</u> | <u>10</u> | <u>15</u> | <u>30</u> | 600 | 40 | 70 | 100 | 30 | 213 | Comparative example |
| 2-13 | 2 | 2 | 3 | 6 | 3800 | 180 | 240 | 100 | 80 | 11 | Conventional example |
| 2-14 | 2 | 2 | 3 | 6 | 4000 | 220 | 260 | 130 | 100 | 9 | Conventional example |

Notes:
1. Underlined values are values outside the suitable range.
2. The basic components of specimen 2-13 are as follows.
Basic components: Fe2O3: 49.0 mol %, ZnO: 21.0 mol %, CoO: 2.0 mol %, MnO: Remaining part
3. The basic components and sub components of specimen 2-14 are as follows.
Basic components: Fe2O3: 49.0 mol %, ZnO: 21.0 mol %, CoO: 2.0 mol %, MnO: Remaining part
Sub components: SiO2: 150 mass ppm, CaO: 500 mass ppm As can be seen in Table 2, it was confirmed that in our examples (test specimens 1-4 and 2-1) in which the contained amounts of both phosphorous and boron are less than 3 mass ppm, the contained amount of sulfur is less than 5 mass ppm and the contained amount of chlorine is less than 10 mass ppm, excellent characteristics were obtained, being an incremental permeability value μΔ of 250 or greater in a temperature range of 0 to 85° C., and an incremental permeability μΔ value of 400 or greater at 65° C., when a 80 A/m direct current magnetic field was applied.

On the other hand, in the comparative examples (test specimens 2-2 to 2-12) in which the contained amount of at least any one of phosphorous, boron, sulfur and chlorine is greater than the proper range, the incremental permeability μΔ value at 0 and 85° C. was less than 250, and the incremental permeability μΔ value at 65° C. was less than 400, when an 80 A/m direct current magnetic field was applied.

EXAMPLE 3

To calcined powder having the same composition as test specimen 1-4 (however, adjusted to phosphorous: 2 mass ppm, boron: 2 mass ppm, sulfur: 3 mass ppm and chlorine: 6 mass ppm), cobalt oxide was added as a sub component so that the final composition and ratios of each component became as given in Table 3, after which the powder was pulverized in a ball mill for 12 hours. Polyvinyl alcohol was added to this pulverized powder and the powder was granulated. Then, 118 MPa pressure was applied to form a toroidal core, after which the compact was placed into a sintering furnace and sintered at a maximum temperature of 1350° C. to obtain a sintered core having an outer diameter of 25 mm, inner diameter of 15 mm and height of 5 mm.

A 10-turn winding was performed for each of the obtained specimens and, using the same direct current application device and LCR meter as used in Example 1, an 80 A/m direct current magnetic field was applied to the magnetic core, and at a measurement voltage of 100 mV and measurement frequency of 100 kHz, the incremental permeability μΔ was measured at 0, 23, 65 and 85° C. The initial permeability μi was measured at 23° C. using an LCR meter (4284A). In addition, to measure the crystal grain size of each of the test specimens, the test specimens were cut through the core, the cut surfaces were then polished and photographed at three different fields of view at a magnification rate of 500 using an optical microscope, after which the average crystal grain size was calculated from the grain sizes measured for the grain particles in the images.

The results are given in Table 3.

TABLE 3

| Specimen number | Sub component (mass ppm) CoO | Initial permeability μi 23° C. | Incremental permeability μΔ under application of an 80 A/m direct current magnetic field | | | | Average crystal grain size (μm) | Remarks |
|---|---|---|---|---|---|---|---|---|
| | | | 0° C. | 23° C. | 65° C. | 85° C. | | |
| 1-4 | 0 | 3300 | 290 | 370 | 460 | 300 | 8 | Invention example |
| 3-1 | 500 | 3500 | 380 | 480 | 580 | 370 | 7 | Invention example |
| 3-2 | 1000 | 3600 | 410 | 500 | 610 | 390 | 7 | Invention example |
| 3-3 | 2000 | 3800 | 430 | 530 | 590 | 380 | 7 | Invention example |
| 3-4 | 2500 | 3600 | 440 | 540 | 570 | 370 | 7 | Invention example |
| 3-5 | <u>3500</u> | 2400 | 200 | 220 | 240 | 190 | 14 | Comparative example |
| 3-6 | <u>5000</u> | 1400 | 150 | 180 | 200 | 130 | 17 | Comparative example |
| 3-7 | <u>10000</u> | 700 | 80 | 120 | 140 | 90 | 26 | Comparative example |

Note:
Underlined values are values outside the suitable range.

As can be seen from Table 3, it was confirmed that for all of our examples (test specimens 3-1 to 3-4) in which the contained amount of cobalt oxide having positive magnetic anisotropy, even greater improvement was obtained when compared with our examples when cobalt oxide was not added, being an incremental permeability value μΔ of 350 or greater in a temperature range of 0 to 85° C., and an incremental permeability μΔ value of 550 or greater at 65° C., when an 80 A/m direct current magnetic field was applied.

On the other hand, in the comparative examples (test specimens 3-5 to 3-7) in which the contained amount of cobalt oxide is greater than 3000 mass ppm, the incremental permeability μΔ greatly dropped over the entire temperature range when an 80 A/m direct current magnetic field was applied.

Moreover, in the conventional examples (test specimens 2-13 and 2-14) in which the basic components, or both the basic components and sub components, were the same as disclosed in JP 2005-179092, and the phosphorous, boron, sulfur and chlorine were restricted to our ranges, incremental permeability μΔ greatly dropped, particularly in the high temperature range at 65° C. and 85° C.

EXAMPLE 4

To calcined powder having the same composition as test specimen 1-4 (however, adjusted to phosphorous: 2 mass ppm, boron: 2 mass ppm, sulfur: 3 mass ppm and chlorine: 6 mass ppm), niobium oxide, tantalum oxide, hafnium oxide and zirconium oxide were added as sub components so that the final composition and ratios of each component became as given in Table 4, after which the powder was pulverized in a ball mill for 12 hours. Polyvinyl alcohol was added to this pulverized powder and the powder was granulated. Then, 118 MPa pressure was applied to form a toroidal core, after which the compact was placed into a sintering furnace and sintered at a maximum temperature of 1350° C. to obtain a sintered core having an outer diameter of 25 mm, inner diameter of 15 mm and height of 5 mm.

A 10-turn winding was performed for each of the obtained specimens and, using the same direct current application device and LCR meter as used in Example 1, an 80 A/m direct current magnetic field was applied to the magnetic core, and at a measurement voltage of 100 mV and measurement frequency of 100 kHz, the incremental permeability μΔ was measured at 0, 23, 65 and 85° C. The initial permeability μi was measured at 23° C. using an LCR meter (4284A). In addition, to measure the crystal grain size of each of the test specimens, the test specimens were cut through the core, the cut surfaces were then polished and photographed at three different fields of view at a magnification rate of 500 using an optical microscope, after which the average crystal grain size was calculated from the grain sizes measured for the grain particles in the images.

The obtained results are given in Table 4.

incremental permeability μΔ value of 500 or greater at 65° C., when an 80 A/m direct current magnetic field was applied.

On the other hand, in the comparative examples (test specimens 4-16 to 4-18) in which the contained amount of even one of niobium oxide, tantalum oxide, hafnium oxide and zirconium oxide is greater than the suitable range, abnormal grain growth occurred and the incremental permeability μΔ greatly dropped over the entire temperature range when an 80 A/m direct current magnetic field was applied.

EXAMPLE 5

To calcined powder having the same composition as test specimen 3-2 (however, adjusted to phosphorous: 2 mass ppm, boron: 2 mass ppm, sulfur: 3 mass ppm and chlorine: 6 mass ppm), niobium oxide, tantalum oxide, hafnium oxide

TABLE 4

| Specimen number | Sub component (mass %) | | | | Initial permeability μi | Incremental permeability Δμ under application of an 80 A/m direct current magnetic field | | | | Average crystal grain size | Remarks |
|---|---|---|---|---|---|---|---|---|---|---|---|
| | ZrO$_2$ | Ta$_2$O$_5$ | HfO$_2$ | Nb$_2$O$_5$ | 23° C. | 0° C. | 23° C. | 65° C. | 85° C. | (μm) | |
| 1-4 | — | — | — | — | 3300 | 290 | 370 | 460 | 300 | 8 | Invention example |
| 4-1 | 0.050 | — | — | — | 3100 | 330 | 420 | 530 | 340 | 7 | Invention example |
| 4-2 | — | 0.050 | — | — | 3100 | 340 | 430 | 540 | 350 | 7 | Invention example |
| 4-3 | — | — | 0.050 | — | 3000 | 330 | 420 | 530 | 340 | 7 | Invention example |
| 4-4 | — | — | — | 0.050 | 3100 | 350 | 420 | 540 | 350 | 7 | Invention example |
| 4-5 | 0.030 | 0.030 | — | — | 3100 | 340 | 430 | 540 | 340 | 6 | Invention example |
| 4-6 | 0.030 | — | 0.030 | — | 3000 | 330 | 420 | 540 | 340 | 7 | Invention example |
| 4-7 | 0.030 | — | — | 0.030 | 3100 | 350 | 430 | 540 | 350 | 7 | Invention example |
| 4-8 | — | 0.030 | 0.030 | — | 3000 | 340 | 420 | 540 | 340 | 7 | Invention example |
| 4-9 | — | 0.030 | — | 0.030 | 3100 | 350 | 430 | 540 | 350 | 7 | Invention example |
| 4-10 | — | — | 0.030 | 0.030 | 3000 | 340 | 420 | 540 | 340 | 7 | Invention example |
| 4-11 | 0.020 | 0.020 | 0.020 | — | 3000 | 340 | 420 | 540 | 340 | 6 | Invention example |
| 4-12 | 0.020 | 0.020 | — | 0.020 | 3000 | 350 | 430 | 540 | 350 | 6 | Invention example |
| 4-13 | 0.020 | — | 0.020 | 0.020 | 2900 | 340 | 420 | 540 | 340 | 7 | Invention example |
| 4-14 | — | 0.020 | 0.020 | 0.020 | 2900 | 350 | 420 | 540 | 350 | 7 | Invention example |
| 4-15 | 0.020 | 0.020 | 0.020 | 0.020 | 2900 | 340 | 440 | 550 | 350 | 6 | Invention example |
| 4-16 | <u>0.080</u> | — | — | — | 2200 | 110 | 170 | 220 | 100 | 103 | Comparative example |
| 4-17 | — | — | <u>0.080</u> | <u>0.080</u> | 1500 | 80 | 130 | 160 | 70 | 145 | Comparative example |
| 4-18 | <u>0.080</u> | <u>0.080</u> | <u>0.080</u> | <u>0.080</u> | 800 | 50 | 90 | 110 | 40 | 198 | Comparative example |

Note:
Underlined values are values outside the suitable range.

As can be seen from Table 4, it was confirmed that for all our examples (test specimens 4-1 to 4-5) which contained a suitable amount of one or two or more of niobium oxide, tantalum oxide, hafnium oxide and zirconium oxide, even greater improvement was obtained when compared with our example (test specimen 1-4) when these components were not added, being an incremental permeability value μΔ of 300 or greater in a temperature range of 0 to 85° C., and an and zirconium oxide were further added as sub components so that the final composition and ratios of each component became as given in Table 5, after which the powder was pulverized in a ball mill for 12 hours.

Polyvinyl alcohol was added to this pulverized powder and the powder was granulated. Then, 118 MPa pressure was applied to form a toroidal core, after which the compact was placed into a sintering furnace and sintered at a maximum temperature of 1350° C. to obtain a sintered core having an outer diameter of 25 mm, inner diameter of 15 mm and height of 5 mm.

A 10-turn winding was performed for each of the obtained specimens and, using the same direct current application device and LCR meter as used in Example 1, an 80 A/m direct current magnetic field was applied to the magnetic core, and at a measurement voltage of 100 mV and measurement frequency of 100 kHz, the incremental permeability μΔ was measured at 0, 23, 65 and 85° C. The initial permeability μi was measured at 23° C. using an LCR meter (4284A). In addition, to measure the crystal grain size of each of the test specimens, the test specimens were cut through the core, the cut surfaces were then polished and photographed at three different fields of view at a magnification rate of 500 using an optical microscope, after which the average crystal grain size was calculated from the grain sizes measured for the grain particles in the images.

The obtained results are given in Table 5.

greater improvement was obtained when compared with our example (test specimen 3-2) when these components were not added, being that the appearance of rough crystal grain size was suppressed and an incremental permeability value μΔ of 450 or greater in a temperature range of 0 to 85° C., and an incremental permeability μΔ value of 800 or greater at 65° C., when an 80 A/m direct current magnetic field was applied.

On the other hand, in the comparative examples (test specimens 5-16 to 5-18) in which the contained amount of even one of niobium oxide, tantalum oxide, hafnium oxide and zirconium oxide is greater than the suitable range, abnormal grain growth occurred and the incremental permeability μΔ greatly dropped over the entire temperature range when an 80 A/m direct current magnetic field was applied.

Industrial Applicability

A MnZn ferrite having excellent characteristics of an incremental permeability μΔ value of 250 or greater in a wide temperature range of 0 to 85° C. and an incremental permeability μΔ value of 400 or greater at 65° C. when an 80 A/m

TABLE 5

| Specimen number | Sub component (mass %) | | | | Initial permeability μi | Incremental permeability Δμ under application of an 80 A/m direct current magnetic field | | | | Average crystal grain size (μm) | Remarks |
|---|---|---|---|---|---|---|---|---|---|---|---|
| | $ZrO_2$ | $Ta_2O_5$ | $HfO_2$ | $Nb_2O_5$ | 23° C. | 0° C. | 23° C. | 65° C. | 85° C. | | |
| 3-2 | — | — | — | — | 3600 | 410 | 480 | 590 | 390 | 7 | Invention example |
| 5-1 | 0.050 | — | — | — | 3300 | 490 | 610 | 850 | 480 | 7 | Invention example |
| 5-2 | — | 0.050 | — | — | 3400 | 490 | 620 | 860 | 490 | 7 | Invention example |
| 5-3 | — | — | 0.050 | — | 3300 | 480 | 610 | 850 | 480 | 7 | Invention example |
| 5-4 | — | — | — | 0.050 | 3400 | 500 | 640 | 870 | 490 | 7 | Invention example |
| 5-5 | 0.030 | 0.030 | — | — | 3300 | 490 | 610 | 850 | 480 | 6 | Invention example |
| 5-6 | 0.030 | — | 0.030 | — | 3200 | 480 | 610 | 850 | 490 | 7 | Invention example |
| 5-7 | 0.030 | — | — | 0.030 | 3400 | 490 | 620 | 860 | 500 | 7 | Invention example |
| 5-8 | — | 0.030 | 0.030 | — | 3200 | 490 | 620 | 870 | 490 | 7 | Invention example |
| 5-9 | — | 0.030 | — | 0.030 | 3300 | 500 | 640 | 870 | 500 | 7 | Invention example |
| 5-10 | — | — | 0.030 | 0.030 | 3200 | 490 | 630 | 860 | 490 | 7 | Invention example |
| 5-11 | 0.020 | 0.020 | 0.020 | — | 3200 | 480 | 620 | 850 | 480 | 6 | Invention example |
| 5-12 | 0.020 | 0.020 | — | 0.020 | 3300 | 490 | 630 | 860 | 500 | 6 | Invention example |
| 5-13 | 0.020 | — | 0.020 | 0.020 | 3100 | 490 | 630 | 850 | 490 | 7 | Invention example |
| 5-14 | — | 0.020 | 0.020 | 0.020 | 3100 | 490 | 630 | 850 | 490 | 7 | Invention example |
| 5-15 | 0.020 | 0.020 | 0.020 | 0.020 | 3100 | 500 | 640 | 860 | 490 | 6 | Invention example |
| 5-16 | — | — | — | 0.080 | 2300 | 120 | 190 | 230 | 100 | 96 | Comparative example |
| 5-17 | 0.080 | 0.080 | — | — | 1700 | 70 | 120 | 140 | 60 | 131 | Comparative example |
| 5-18 | 0.080 | 0.080 | 0.080 | 0.080 | 1000 | 50 | 80 | 100 | 40 | 188 | Comparative example |

Note:
Underlined values are values outside the suitable range.

As can be seen from Table 5, it was confirmed that for all our examples (test specimens 5-1 to 5-15) which contained a suitable amount of one or two or more of niobium oxide, tantalum oxide, hafnium oxide and zirconium oxide, even direct current magnetic field is applied can be obtained, and particularly a MnZn ferrite can be obtained that is suitable for use in the magnetic core of a pulse transformer of an Ethernet (registered trademark) device.

The invention claimed is:

1. A MnZn ferrite comprising:
   a basic component consisting essentially of ferrite oxide (in terms of $Fe_2O_3$): 51.0 to 54.5 mol %, zinc oxide (in terms of ZnO): 8.0 to 11.0 mol %, and manganese oxide (in terms of MnO): balance;
   a sub component consisting of silicon oxide (in terms of $SiO_2$): 50 to 400 mass ppm, and calcium oxide (in terms of CaO): 50 to 4000 mass ppm; and
   unavoidable impurities comprising:
   phosphorous: less than 3 mass ppm,
   boron: less than 3 mass ppm,
   sulfur: less than 5 mass ppm, and
   chlorine: present but in an amount less than 10 mass ppm,
   wherein the sub component is added to the basic component, the ferrite has an incremental permeability µΔ value of 250 or more in a temperature range of 0 to 85° C. and 400 or more at a temperature of 65° C. when an 80 A/m direct current magnetic field is applied and the ferrite has an average crystal grain size of 5 to less than 15 µm.

2. The MnZn ferrite according to claim 1, wherein the sub component further comprises cobalt oxide (in terms of CoO): 50 to 3000 mass ppm.

3. The MnZn ferrite according to claim 1, wherein the sub component further comprises one or more than two selected from the group consisting of:
   zirconium oxide (in terms of $ZrO_2$): 0.005 to 0.075 mass %,
   tantalum oxide (in terms of $Ta_2O_5$): 0.005 to 0.075 mass %,
   hafnium oxide (in terms of $HfO_2$): 0.005 to 0.075 mass %, and
   niobium oxide (in terms of $Nb_2O_5$): 0.005 to 0.075 mass %.

4. The MnZn ferrite according to claim 2, wherein the sub component further comprises one or more than two selected from the group consisting of:
   zirconium oxide (in terms of $ZrO_2$): 0.005 to 0.075 mass %,
   tantalum oxide (in terms of $Ta_2O_5$): 0.005 to 0.075 mass %,
   hafnium oxide (in terms of $HfO_2$): 0.005 to 0.075 mass %, and
   niobium oxide (in terms of $Nb_2O_5$): 0.005 to 0.075 mass %.

5. A magnetic core for a transformer comprising the MnZn ferrite according to claim 1.

6. A magnetic core for a transformer comprising the MnZn ferrite according to claim 2.

7. A magnetic core for a transformer comprising the MnZn ferrite according to claim 3.

8. A magnetic core for a transformer comprising the MnZn ferrite according to claim 4.

9. A MnZn ferrite comprising:
   a basic component consisting essentially of ferrite oxide (in terms of $Fe_2O_3$): 51.0 to 54.5 mol %, zinc oxide (in terms of ZnO): 8.0 to 11.0 mol %, and manganese oxide (in terms of MnO): balance;
   a sub component consisting of silicon oxide (in terms of $SiO_2$): 50 to 400 mass ppm, and calcium oxide (in terms of CaO): 50 to 4000 mass ppm; and
   unavoidable impurities comprising:
   phosphorous: less than 3 mass ppm,
   boron: less than 3 mass ppm,
   sulfur: less than 5 mass ppm, and
   chlorine: present but in an amount less than 10 mass ppm,
   wherein the sub component is added to the basic component, the ferrite has an incremental permeability µΔ value of 250 or more in a temperature range of 0 to 85° C. and 400 or more at a temperature of 65° C. when an 80 A/m direct current magnetic field is applied, the ferrite has an average crystal grain size of 5 to less than 15 µm and is free of CoO.

10. A MnZn ferrite consisting of:
    a basic component consisting of ferrite oxide (in terms of $Fe_2O_3$): 51.0 to 54.5 mol %, zinc oxide (in terms of ZnO): 8.0 to 11.0 mol %, and manganese oxide (in terms of MnO): balance;
    a sub component consisting of silicon oxide (in terms of $SiO_2$): 50 to 400 mass ppm, and calcium oxide (in terms of CaO): 50 to 4000 mass ppm and, optionally, one or more than two selected from the group consisting of zirconium oxide (in terms of $ZrO_2$): 0.005 to 0.075 mass %, tantalum oxide (in terms of $Ta_2O_5$): 0.005 to 0.075 mass %, hafnium oxide (in terms of $HfO_2$): 0.005 to 0.075 mass %, and niobium oxide (in terms of $Nb_2O_5$): 0.005 to 0.075 mass %; and
    unavoidable impurities consisting of:
    phosphorous: less than 3 mass ppm,
    boron: less than 3 mass ppm,
    sulfur: less than 5 mass ppm, and
    chlorine: present but in an amount less than 10 mass ppm,
    wherein the sub component is added to the basic component, the ferrite has an incremental permeability µΔ value of 250 or more in a temperature range of 0 to 85° C. and 400 or more at a temperature of 65° C. when an 80 A/m direct current magnetic field is applied and the ferrite has an average crystal grain size of 5 to less than 15 µm.

* * * * *